W. A. ZEIDLER.
MACHINE FOR FOLDING AND SHAPING TURN-DOWN COLLARS.
APPLICATION FILED FEB. 6, 1906. RENEWED MAR. 29, 1911.

1,010,713.

Patented Dec. 5, 1911.

5 SHEETS—SHEET 1.

WITNESSES:

INVENTOR
William A. Zeidler
BY
Chas. C. Gill
ATTORNEY

COLUMBIA PLANOGRAPH CO., WASHINGTON, D. C.

W. A. ZEIDLER.
MACHINE FOR FOLDING AND SHAPING TURN-DOWN COLLARS.
APPLICATION FILED FEB. 6, 1906. RENEWED MAR. 29, 1911.
1,010,713.
Patented Dec. 5, 1911.
5 SHEETS—SHEET 5.
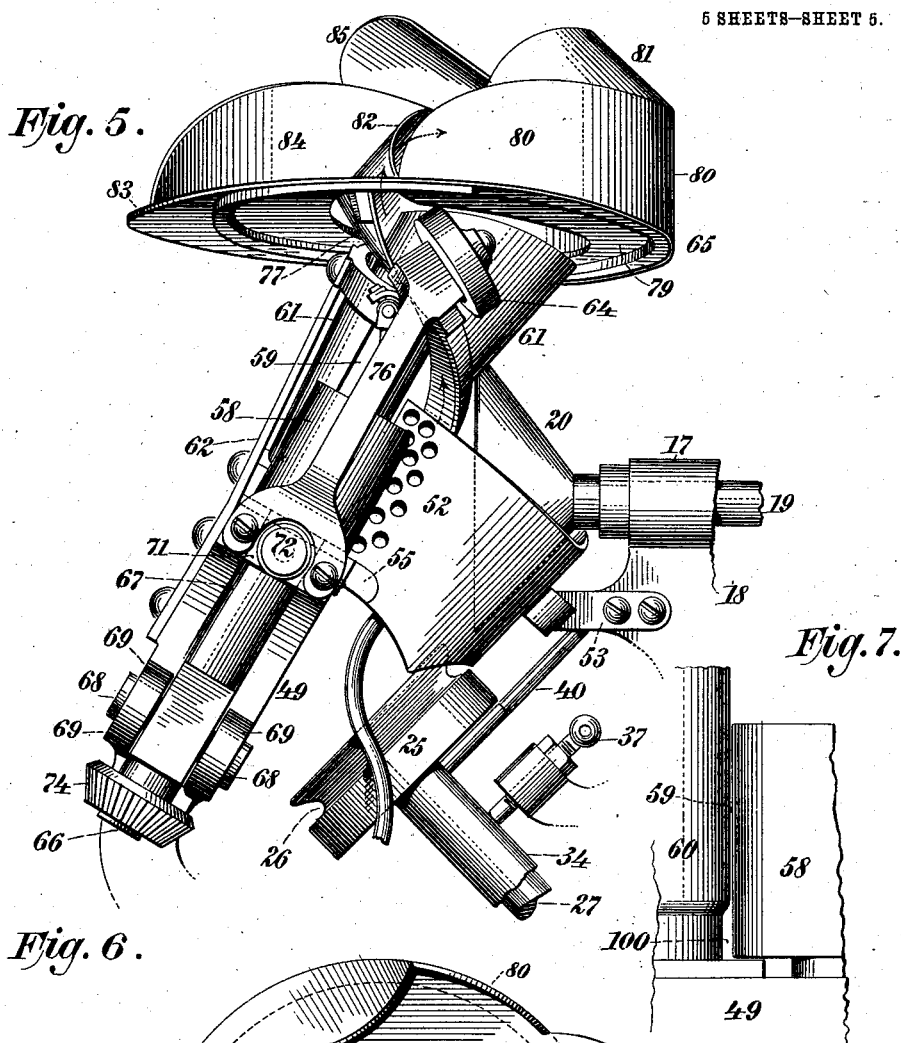
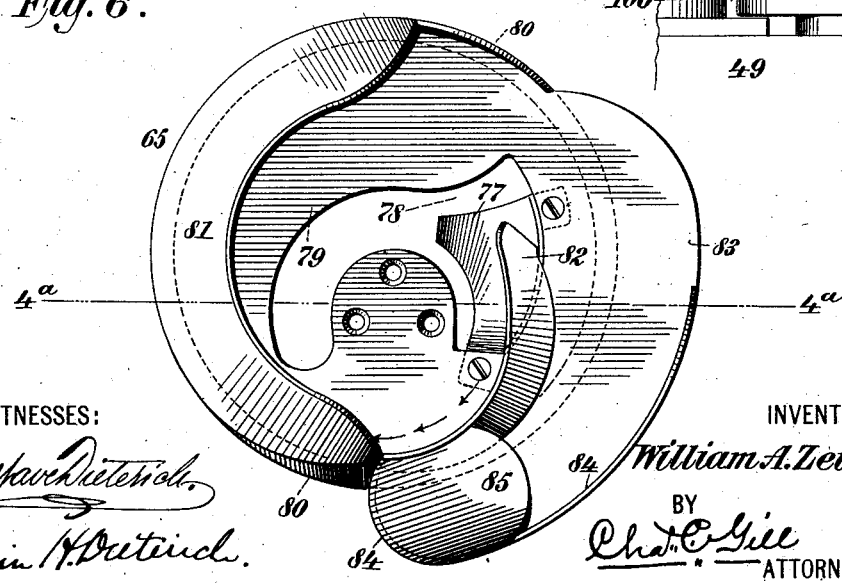
WITNESSES:
INVENTOR
William A. Zeidler
BY
ATTORNEY

UNITED STATES PATENT OFFICE.

WILLIAM A. ZEIDLER, OF NEW YORK, N. Y., ASSIGNOR OF ONE-HALF TO GILBERT A. CLARK, OF NEW YORK, N. Y.

MACHINE FOR FOLDING AND SHAPING TURN-DOWN COLLARS.

1,010,713. Specification of Letters Patent. Patented Dec. 5, 1911.

Application filed February 6, 1906, Serial No. 299,688. Renewed March 29, 1911. Serial No. 617,719.

*To all whom it may concern:*

Be it known that I, WILLIAM A. ZEIDLER, a citizen of the United States, and a resident of New York city, in the county of New York and State of New York, have invented certain new and useful Improvements in Machines for Folding and Shaping Turn-Down Collars, of which the following is a specification.

The invention relates to improvements in machines for folding and shaping turn-down collars and similar articles; and it consists in the novel features and combinations of parts hereinafter described and particularly pointed out in the claims.

The object of the invention is to provide a machine which will uniformly and properly fold and shape the collars in a manner which will render the latter entirely satisfactory to the wearer and not injure the collar.

Figure 1:
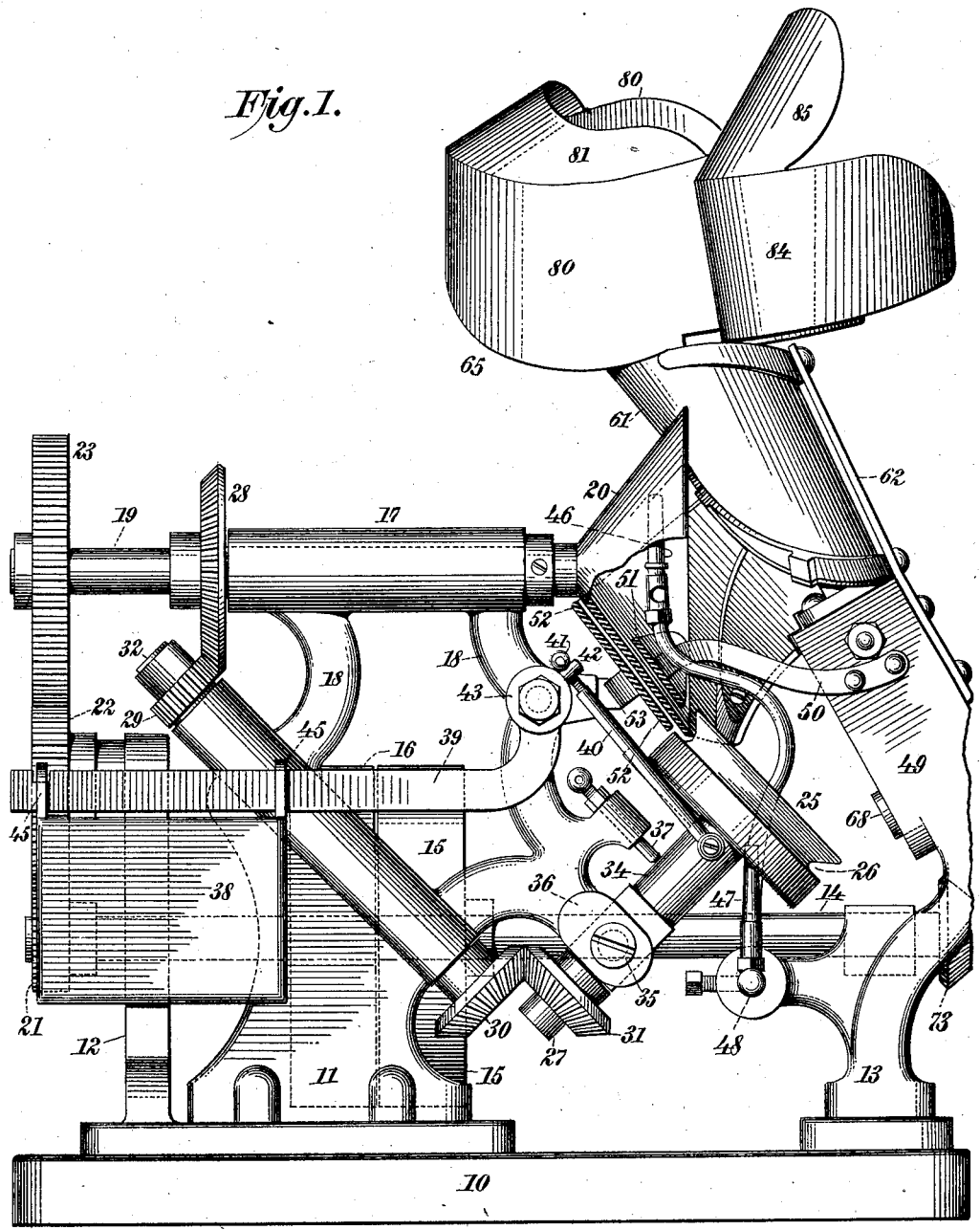
Figure 2:
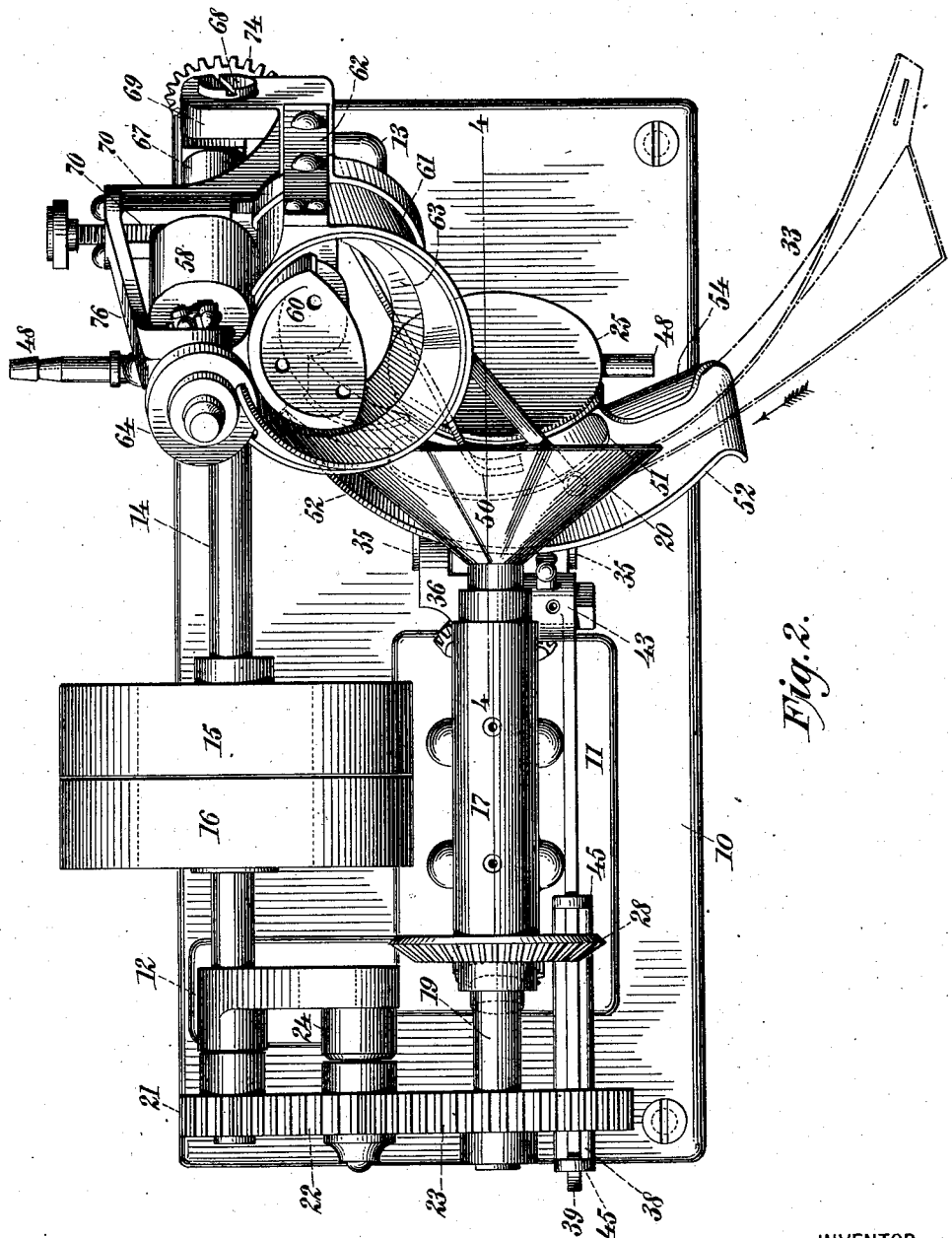
Figure 3:
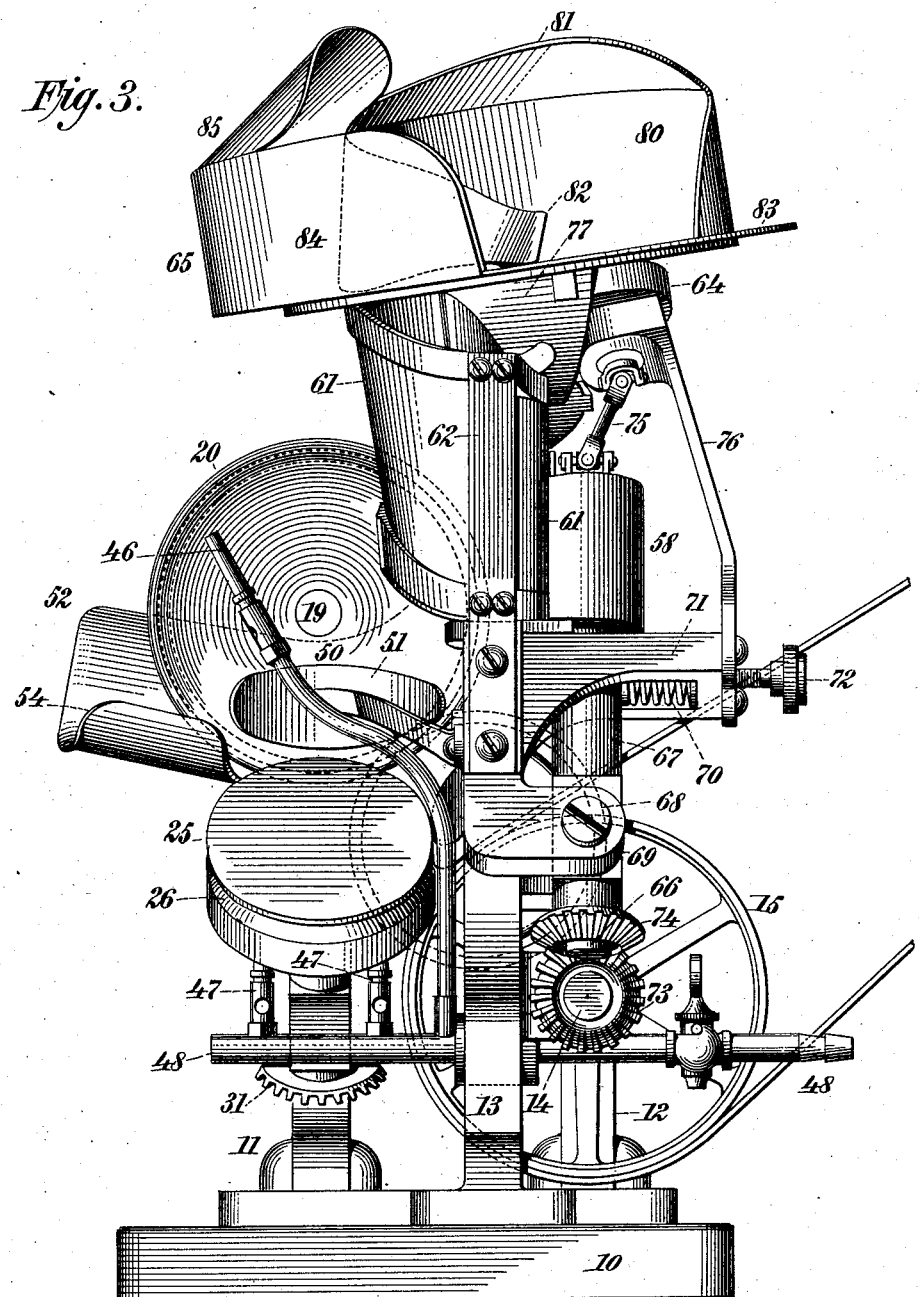
Figure 4:
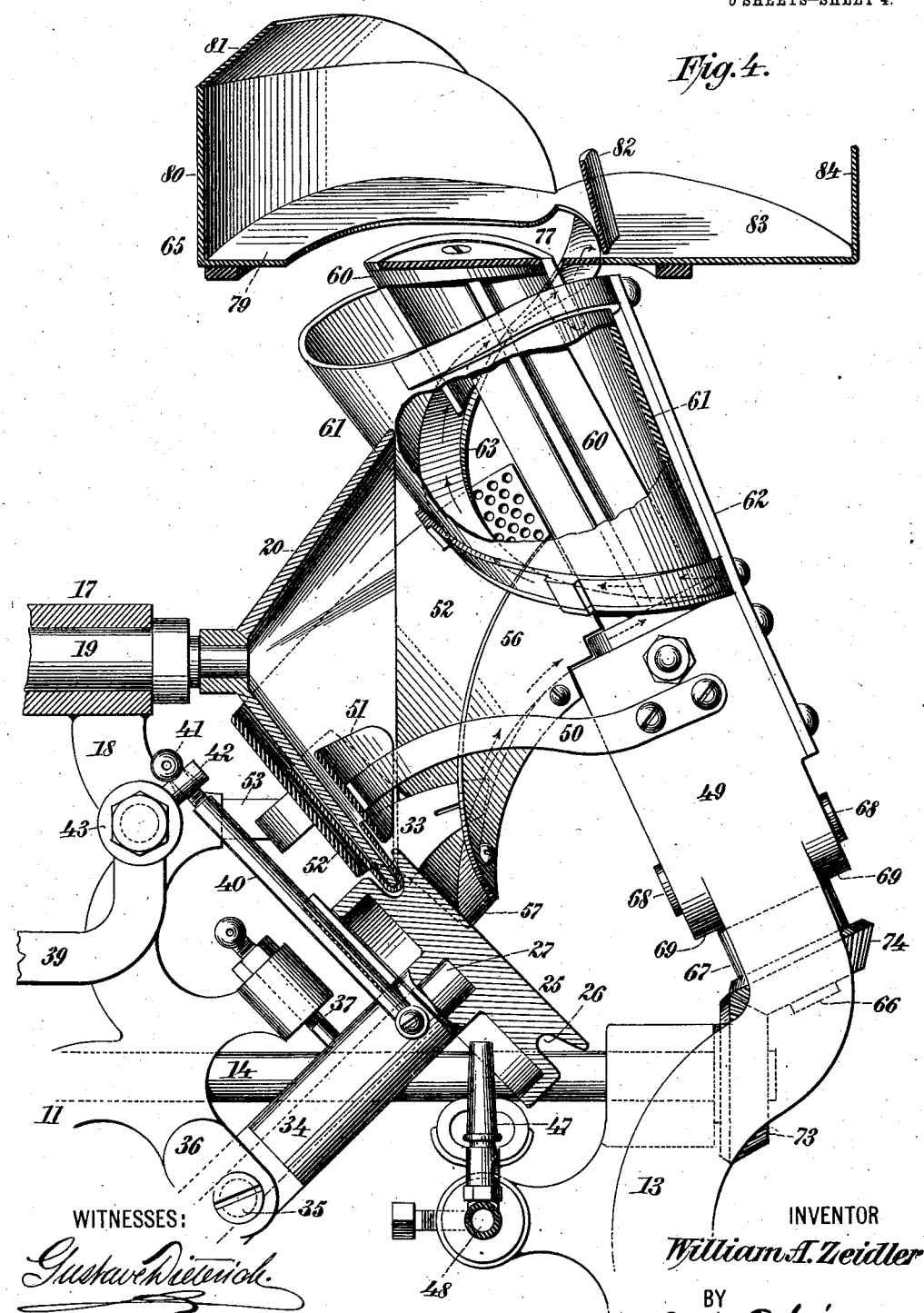

The present invention comprises certain improvements, hereinafter described, upon the machines made the subject of Letters Patent No. 642,660 granted February 6, 1900 to William A. Zeidler and No. 646,784 granted April 3, 1900 to William A. Zeidler, and said invention will be fully understood from the detailed description hereinafter presented, reference being had to the accompanying drawings, in which:

Figure 1 is a side elevation, partly broken away and partly in section, of a machine constructed in accordance with and embodying the invention; Fig. 2 is a top view of same, the superposed receptacle to receive the finished collars being omitted; Fig. 3 is an end view of same, the receptacle to receive the finished collars being shown in position; Fig. 4 is a vertical longitudinal section on the dotted line 4—4 of Fig. 2 of a part of the machine, the wall of the upper guide and shaper for the collars being partly broken away and the receptacle to receive the finished collars being shown in section on a line represented by the dotted line 4ª—4ª of Fig. 6; Fig. 5 is a rear elevation of a part of one end of the machine, Fig. 5 being taken from the rear side of the machine and Figs. 1 and 4 from the front side thereof; Fig. 6 is a detached top view of the receptacle for receiving or into which are fed the finished collars and from which said collars are from time to time, as required, removed by hand, and Fig. 7 is a detail of a portion of the mechanism for feeding the folded collar to the shaper.

In the drawings, 10 designates the bed of the machine, and 11, 12 and 13 denote respectively three standards upon said bed plate and which support all of the operative mechanism of the machine. The main driving shaft 14 is mounted in the standards 12, 13 and is provided with a loose pulley 15 and fast pulley 16, as usual, whereby said shaft and the parts connected with it may be driven by power. Within a sleeve 17 supported by arms 18 from the standard 11 is mounted an auxiliary driving shaft 19, upon the front end of which is secured a conical shaping disk 20 of the character described in my aforesaid Letters Patent. The shaft 19 is driven from the shaft 14 through a series of gear wheels 21, 22 and 23 (Figs. 1 and 2), the gear wheel 21 being rigid on the shaft 14, the gear wheel 23 rigid on the shaft 19 and the gear wheel 22 being simply an intermediate gear supported on a stud 24 extending from an arm forming a part of the standard 12 (Fig. 2).

The conical shaping disk 20 has imparted to it during the operation of the machine a rotary motion but is otherwise rigidly held, and said disk 20 has its conical interior extended outwardly from the end of the shaft 19, whereby the interior chamber of said disk is not occupied by any portion of the shaft and is exposed so that the collars may readily pass through the same and be observed by the operator.

The conical disk 20 coöperates with a rotary ironing and shaping roller 25 having an annular groove 26 into which the edge of the disk 20 enters. The ironing roller 25 is secured upon the upper end of a shaft 27 which extends upwardly and outwardly and is adapted to be driven from the shaft 19 through the gear wheels 28, 29, 30, 31, (Fig. 1) and an inclined shaft 32, the gear wheels 29, 30 being on the shaft 32, the gear wheel 28 on the shaft 19 and the gear wheel 31 on the shaft 27. The disk 20 and ironing roller 25 rotate toward each other and the folded collar 33 is fed in between the adjoining portions of said disk and roller, as shown in Fig. 4, the inner fold or section of the collar being disposed within the disk 20, the outer fold or section of the collar against the exterior of said disk and the folded edge of the collar being against the edge of said disk and within the groove 26 of said roller 25.

The ironing roller 25 should have a yielding relation to the edge of the shaping disk 20 because of the varying thicknesses of collars and in order to enable said roller to properly engage the folded edge of the collar without injuring the same, and to provide for this condition I mount the shaft 27 within a sleeve 34 (Fig. 1) which is pivotally supported upon the inner ends of screws 35 (Fig. 2) which enter arms 36 extending forwardly and downwardly from and are integral with the standard frame 11. The shaft 27 may, therefore, have a limited tilting or oscillatory motion imparted to it and thereby the ironing roller 25 may have its relation to the disk 20 regulated at will. If left unrestrained the roller 25 would have a tendency to fall away from the disk 20 so far as the gear wheels 31, 30 would permit, and to prevent any undue approach of the roller 25 toward the disk 20 I provide an adjustable stop 37 which is supported from the main standard or frame 11 and is in line with the sleeve 34. It is desirable that the roller 25 should remain in near relation to the disk 20 but it is not desirable, in many instances, that said roller should press with great force directly against said disk, for under such condition the collar passing through the machine might be injured at its folded edge. The roller 25 is given a yielding pressure toward the disk 20 by means of a weight 38, crank arm or beam 39 and rod 40, the latter at its lower end being pivotally secured to the sleeve 34 and at its upper end having a threaded section 41 which passes loosely through a stud 42 extending upwardly and forwardly from the hub 43 of the crank arm 39. The forward end of the crank arm 39 extends upwardly, as shown in Fig. 1, and terminates in the aforesaid hub 43, through which a pivot-screw 143 passes, this screw constituting the pivotal point for said arm. The weight of the roller 25 and the freedom of play between the gear wheels 31, 30 enables said roller, through the rod 40, to normally hang from the stud 42 of the crank arm 39, and the roller 25 is restrained from falling unduly away from the disk 20 by the fact that the head of the adjustable section 41 of the rod 40 has a bearing against the upper side of said stud 42. When a collar is inserted between the disk 20 and ironing roller 25 it is fed inwardly by the rotary action of said disk and roller and due to the thickness of the collar the roller 25 is forced downwardly in a direction from the disk 20, and this downward movement of the roller 25 is resisted by the weight 38. The weight 38, crank arm 39 and stud 42 hold the roller 25 in a proper initial relation to the disk 20, but when a collar is inserted between said disk and roller, the thickness of the collar presses the roller 25 slightly downwardly, and said roller 25 when thus pressed downwardly operates through the rod 40, stud 42 and arm 39 to slightly elevate the weight 38, whereby the latter is enabled to cause the roller 25 to yieldingly press against the collar. The adjustable stop 37 prevents the weight 38 from unduly elevating the roller 25 toward the disk 20, and the force the weight 38 may exert against the roller 25 may be varied by adjusting said weight along the arm or beam 39, the weight 38 exerting the greatest force when it is at the outer or left hand end of said arm or beam 39. The adjustable section 41 at the upper end of the rod 40 has at its outer end a knob or enlargement which pulls against the stud 42 when the ironing roller 25 is pressed downwardly, and the said section 41 is made adjustable so that it may be passed through the stud 42 and screwed into the end of the rod 40 and also so that it may be utilized to regulate the length of said rod 40.

The stud 42 represents a short lever and the arm or beam 39 a long lever, which is substantially horizontally disposed at the front side of the machine, and the weight 38 is hung by loops 45 from said arm or beam 39. With a reasonably light weight hung from the arm 39 the ironing roller 25 may be caused to press with considerable force against the collar passing through the machine, this being due to the leverage of said arm 39. The arm 39 and weight 38 are at the front of the machine where the operator is located to feed in the collars, and hence said weight is conveniently disposed for ready adjustment.

When the machine is in use the conical disk 20 will be heated by a flame from a gas burner 46 and the ironing roller 25 will be heated by flames from gas burners 47, which burners 46, 47, are, as shown in Fig. 3, connected with the gas supply pipe 48 supported in the front standard 13 of the machine. The front standard 13 is formed with an upwardly and inwardly inclined head 49 from which, by means of an arm 50, is supported a curved guiding and shaping plate 51 which lies within the lower portion of the conical disk 20 and is separated from the inner surface of said disk to a sufficient extent to enable the inner fold of a collar to pass between it and said surface of said disk. The plate 51 compels the inner fold of the collar to travel close against the inner surface of the disk 20, but said plate is free of said disk and constitutes the inner guide for the collar.

At the outer side of the lower portion of the disk 20 is arranged a curved plate guide and shaper 52 which is supported by an arm 53, Fig. 5, from a portion of the standard or frame 11 and is in the form of a broad inclined curved plate at the lower edge of whose front portion is an upwardly turned lip 54 (Figs. 2 and 3) into which the fold of the collar is placed and which directs said fold in between the disk 20 and ironing roller 25. The plate 52 inclines upwardly and inwardly and curves closely along the lower side of the conical disk 20, as shown in Figs. 1, 2 and 3, said plate continuing rearwardly on a curved line and at its lower rear corner being secured by a small angle-plate 55 to a portion of the head 49 (Fig. 5). The plate 52 not only directs the fold of the collar to position in between the disk 20 and roller 25 but compels the outer section of the collar to travel close against the exterior wall of the disk 20, the plates 51 and 52 coöperating to compel the two folded parts of the collar while traveling through the machine, to move close against and follow the curvature of the inner and outer walls of said disk. Beyond the disk 20 the plate 52 is provided with an inner curved plate 56 (Fig. 4), and between the plates 56, 52 is provided an upwardly inclined floor 57 up which the collar traveling through the machine is compelled to pass, the folded edge of the collar riding on said floor 57, while the two folds of the collar are confined between said plates 56, 52, both of which are correspondingly curved whereby they are enabled to retain the collar in a curved condition. The curvature of the plates 56, 52 is such as to enable the collar to become partly shaped, but it is on too great an arc to effect the final shaping of the collar, and hence upon the upper portion of the head 49 I provide additional means for receiving the collar from the plates 56, 52 and completing the shaping thereof.

The plates 56, 52 and floor 57 direct the collar upwardly and deliver it to a point between a rubber or frictional feed roller 58 and a polished rounded surface 59 (Fig. 5) on the rear side of the standard 60 which inclines upwardly and inwardly from the upper end of the head 49, the front wall of said standard being shown in Fig. 4 and the rear wall thereof being curved to coöperate with the roller 58 in effecting the onward travel of the collar.

The rounded surface 59 on the post or standard 60 does not extend to the lower edge of the roller 58, a recess 100 being formed in said standard opposite to the lower portion of said roller, as shown in Fig. 7, this recess being to enable the feeding of the collar between the roller and standard without said parts creating any material pressure against the folded edge of the collar, this being an important feature since thereby the folded edge of the collar is left with correctly rounded surfaces and the collar does not become broken at its folded edge, as is the case in machines which during the feeding of collars pinch the folded edge of same. The inner fold of the collar moves against the standard 60 and the outer fold thereof is engaged by the rubber roller 58, and the latter extends across the full width of the outer fold of the collar so as to effectually feed and not leave any mark on the same, as might be the case if the lower end of the roller 58 pressed against the outer fold of the collar along a line above the edge thereof.

The plates 56, 52 terminate at the space between the roller 58 and curved face 59 of the standard 60, and immediately beyond the contact surfaces of the roller 58 and standard 60 I provide a plate guide and shaper 61 which is somewhat of conical shape and takes a spiral course upwardly and around said standard 60. The guide 61 is supported from the head 49 by means of a rod 62, and along its inner lower spiral edge, the guide 61 is formed with a floor 63 which receives the collars from the roller 58 and directs them upwardly along a spiral course, the collars upon leaving the roller 58 traveling around within the guide and shaper 61 toward the front side of the machine and then around toward the rear side thereof on an upward spiral course and finally emerging from the guide 61 at a point between the upper rear curved side of the standard 60 and a small oblique rubber wheel 64 (Figs. 2 and 5), whence the collars pass into the superposed receptacle 65, which is fastened by screws upon the upper end of the standard 60, the screw holes for the screws being represented in Figs. 2 and 6.

The guide 61 is of conical spiral nature and within it the shaping of the collar into its proper curved form for use is completed, the collar after leaving the plates 56, 52 being closely coiled on a spiral line within the guide 61 and held therein, during the period of travel, a sufficient length of time to receive a proper "set", after which the collars are allowed to spread somewhat within the receptacle 65, from which they are, from time to time, removed by hand.

The roller 58 is mounted upon a shaft 66 confined within a sleeve 67 which is pivotally held by screws 68 in a fork 69 constituting a part of the head 49, whereby said roller 58 is enabled to yield outwardly from the standard 60 during the travel of the collars between said roller and standard. A coiled spring 70 (Figs. 2 and 3) is provided to press against the sleeve 67 for the purpose of imparting to the roller 58 a yielding or spring pressure against the collars passing between it and the standard 60, said spring 70 being held in a suitable frame 71 and being adjustable with respect to its tension by means of a screw 72. The roller 58 and its shaft 66 receive their rotary motion from the main driving shaft 14 through the beveled gear wheel 73 secured on said shaft 14 and the intermeshing beveled gear wheel 74 secured on the lower end of said shaft 66. During the operation of the machine the feed and pressure wheel 58 therefore has a rotary motion imparted to it and it presses the folded collars against the standard 60 and compels the collars to take a spiral course upwardly through the guide and shaper 61.

The wheel 64 will preferably be of rubber or other frictional material and it has a rotary motion imparted to it from the shaft of the roller 58, the shaft of said roller and the shaft of said wheel being connected by a universal joint connection 75 (Fig. 3), whereby rotary motion may be imparted to the wheel 64 without regard to the yielding movements of the roller 58 and its shaft. The wheel 64 is carried upon the upper end of an arm 76 (Figs. 2, 3, 5) which is somewhat yielding and intended to press, with a spring pressure, the roller 64 against the rear curved side of the upper end of the standard 60.

I have hereinbefore described all of the structural features of the machine with the exception of the superposed receptacle 65, which, as hereinbefore explained, receives the completed collars from the guide and shaper 61 and is fastened upon the upper end of the standard 60.

The receptacle 65 is provided with a downwardly extending lip 77 (Fig. 6) which projects downwardly into approximately near relation to the discharge sides of the wheel 64 and standard 60 (Figs. 3, 4, 5), and directs the collars leaving said standard and wheel upwardly into the main compartment of said receptacle, the floor of said receptacle being slotted, as at 78, (Fig. 6) to permit the ascent of the collars. The receptacle 65 comprises the aforesaid lip 77, floor 79, circular rim 80, a partial cover 81 along said rim and a guiding flange 82 which constitutes a portion of the rim 80 but as shown in Fig. 6, is deflected inwardly over the guiding lip 77 to compel the collars to travel along the inner wall of said rim 80. Beyond the general outline of the rim 80 the floor 79 is extended outwardly, as at 83 (Fig. 6), along one portion of which is provided a vertical rim or wall 84 over whose terminus is a cover 85, the latter being secured to the rims 84 and 80. The collars fed into the receptacle 65 travel along the inner wall of the rim 80 in the direction of the arrows (Fig. 6) and will gather within said receptacle along the said wall, the collars finally lying one against the other within that portion of the receptacle 65 represented at the left hand side of Fig. 6, the outer ends of the collars passing upon the extension 83 of the floor of the receptacle and finally entering the chamber below the covering plate 85. The rim 84 and cover 85 prevent the collars from discharging from the receptacle, and after a suitable number of collars have gathered within the receptacle, either regularly or irregularly disposed therein, they are removed by hand. The circular rim 80 of the receptacle 65 prevents the spreading out of the collars to any undue extent, and the collars when removed from the receptacle are found to be properly ironed, shaped and "set" and ready for use.

The operation of the machine will be largely understood from the description hereinbefore presented and hence only brief further explanation is required. The disk 20 and its shaft 19 are driven from the main driving shaft 14 through the series of gear wheels 21, 22, 23, and the ironing roller 25 is driven from the shaft 19 through the gear wheels 28, 29, 30, 31 and shafts 32, 27. The roller 58 is driven from the shaft 14 through the gear wheels 73, 74, and the feed wheel 64 receives its motion from the shaft of the rubber roller 58. The collars are fed to the disk 20 and roller 25 by hand and with the aid of the guiding plate 52, as indicated by dotted lines in Fig. 2. The fold of the collar passes between the edge of the disk 20 and the surface of the groove 26 in the roller 25, while the inner fold or section of the collar is delivered between the inner surface of the disk 20 and the adjacent surface of the plate 51, and the outer fold or section of the collar passes between the outer surface of said disk and the inner adjacent surface of said plate 52. The disk 20 and roller 25 will grip the collar and draw the same into the machine and compel the collar to travel along the plate 52 and up the inclined floor 57 thereof. The plates 52, 56 and floor 57 deliver the folded collar, ironed along its folded edge, to the roller 58, which due to its rotation and the pressure exerted by it against the collar between it and the standard 60, draws the collar upwardly from the guides 52, 56 and compels the collar to travel upwardly along the spiral floor 63 of the guide 61, wherein the collar is properly shaped. Finally as the collar reaches the upper end of the floor 63 and guide 61 it is engaged by the rubber wheel 64 which coöperating with the curved rear surface of the standard 60, compels the collar to ride up the lip 77 of the receptacle 65 and enter the latter, the treatment of the collar then having been completed. I indicate in Fig. 4 by arrows the path taken by the collar on its passage from the ironing roller 25 and disk 20 to the receptacle 65, showing only a portion of the collar in Fig. 4 so as not to obscure the representation of the several parts of the machine.

The special features constituting the invention relate to the general arrangement of the parts of the machine, the special coöperative arrangement of the disk 20 and roller 25, the means for enabling the roller 25 to have a yielding pressure toward the disk 20 and the guides for properly directing and shaping the collar after it leaves the disk 20 and roller 25.

What I claim as my invention and desire to secure by Letters-Patent, is:

1. In a collar-folding and shaping machine, a shaft having on its forward end a hollow conical disk whose walls flare forwardly and outwardly, means for driving said shaft and disk, a rotary grooved roller below said disk and coöperating therewith and receiving within its groove the edge of said disk, means for directing the collar through said disk and roller with its folded edge in the groove of said roller, and shaper-mechanism for receiving the collar as it leaves said disk and roller and curving the same into shape for use and comprising power driven means directly engaging the collar at its side and compelling its onward travel while being shaped; substantially as set forth.

2. In a collar-folding and shaping machine, a horizontal shaft having upon its forward end a hollow conical disk whose walls flare forwardly and outwardly from the end of said shaft, and means connected with said shaft for driving the same, combined with a grooved roller coöperating with said conical disk and receiving within its groove the lower edge portion thereof, said roller being located centrally below said disk, means for rotating said roller, guides for compelling the folded portions of the collar to travel on the inner and outer walls of said conical disk, means pivotally mounting the shaft of said roller, means for yieldingly pressing said roller toward said disk, and a stop for limiting the movement of said roller toward said disk; substantially as set forth.

3. In a collar-folding and shaping machine, a shaft, a hollow conical disk whose walls flare forwardly and outwardly from the end of said shaft, means for rotating said shaft and disk, a grooved roller coöperating with said disk and receiving within its groove the edge of same, guides for compelling the folded portions of the collar to travel on the inner and outer walls of said conical disk, means pivotally mounting the shaft of said roller, means for rotating said roller, and means for yieldingly pressing said roller toward said disk and comprising a pivotally mounted arm having at one side of its pivot a weight and at the other side of its pivot a stud and a rod connecting said roller with said stud; substantially as set forth.

4. In a collar-folding and shaping machine, a shaft having upon its forward end a hollow conical disk, whose walls flare forwardly and outwardly from the end of said shaft, means for rotating said shaft, a grooved roller coöperating with said disk and receiving within its groove the edge of same, guides for compelling the folded portions of the collar to travel on the inner and outer walls of said conical disk, means pivotally mounting the shaft of said roller, means for rotating said roller, and means for yieldingly pressing said roller toward said disk and comprising a substantially horizontal crank arm having thereon at one side of its pivot an adjustable weight and a connection between said roller and said arm at the other side of said pivot; substantially as set forth.

5. In a collar-folding and shaping machine, a horizontal shaft having upon its forward end a hollow conical disk whose walls flare forwardly and outwardly from the end of said shaft, means connected with said shaft for driving the same, a grooved roller below said disk and coöperating therewith and receiving within its groove the edge of said disk at the lower side of the latter, guides for directing the collar through and beyond said disk and roller, a spiral guide and shaper receiving the collar from said guides, and means for compelling the folded collar to follow the spiral course within said guide and shaper; substantially as set forth.

6. In a collar-folding and shaping machine, a horizontal shaft having upon its forward end a hollow conical disk whose walls flare forwardly and outwardly from the end of said shaft, means connected with said shaft for driving the same, a grooved roller below said disk and coöperating therewith and receiving within its groove the edge of said disk at the lower side of the latter, guides for directing the collar through and beyond said disk and roller, a conical shaper receiving the collar from said guides and having within its interior an upwardly extending spiral guide, and means for compelling the folded collar to follow the course of said spiral guide; substantially as set forth.

7. In a collar-folding and shaping machine, a horizontal shaft having upon its front end a hollow conical disk whose walls flare forwardly and outwardly from the end of said shaft, means connected with said shaft for driving the same, a grooved roller below said disk and coöperating therewith and receiving within its groove the edge of said disk at the lower side of the latter, guides for directing the collar through and beyond said disk and roller, an upwardly extending spiral guide and shaper receiving the collar from the said guides, means for compelling the folded collar to follow the spiral course of said spiral guide, and a receptacle above said spiral guide and shaper to receive the collar discharged therefrom; substantially as set forth.

8. In a collar-folding and shaping machine, a conical disk, a grooved roller coöperating therewith and receiving within its groove the edge of said disk, guides for directing the collar through and beyond said disk and roller, a spiral guide and shaper to receive the collar from said guides, a standard extending upwardly through said spiral guide and shaper, a pressure roller for coöperating with said standard in compelling the collars to enter and follow the spiral course of said spiral guide, and means for rotating said roller; substantially as set forth.

9. In a collar-folding and shaping machine, a conical disk, a grooved roller coöperating therewith and receiving within its groove the edge of said disk, guides for directing the collar through and beyond said disk and roller, a spiral guide and shaper to receive the collar from said guides, a standard extending upwardly through said spiral guide and shaper, a pressure roller for coöperating with said standard in compelling the collar to enter and follow the spiral course of said spiral guide, means for rotating said roller, and a supplemental wheel for engaging the collars at the discharge portion of said spiral guide and shaper and aiding in the movement of the collar therefrom; substantially as set forth.

10. In a collar-folding and shaping machine, a conical disk, a grooved roller coöperating therewith and receiving within its groove the edge of said disk, guides for directing the collar through and beyond said disk and roller, a spiral guide and shaper to receive the collar from said guides, a standard extending upwardly through said spiral guide and shaper, a pressure roller for coöperating with said standard in compelling the collars to enter and follow the spiral course of said spiral guide, means for rotating said roller, a supplemental wheel for engaging the collars at the discharge portion of said spiral guide and shaper and aiding in the movement of the collar therefrom, and a receptacle to receive the finished collars from said conical guide and shaper, said receptacle being mounted above said shaper and having an opening through which the collars are fed thereto; substantially as set forth.

11. In a collar-folding and shaping machine, a shaft having on its forward end a hollow conical disk whose walls flare forwardly and outwardly, means for driving said shaft and disk, a rotary grooved roller below said disk and coöperating therewith and receiving within its groove the edge of said disk, guides for directing the collar through and beyond said disk and roller, a shaper for receiving the collar as it leaves said disk and roller, and means at the discharge side of said disk and roller for engaging the collar and forcing it along said shaper; substantially as set forth.

12. In a collar-folding and shaping machine, a shaft having on its forward end a hollow conical disk whose walls flare forwardly and outwardly, means for driving said shaft and disk, a rotary grooved roller below said disk and coöperating therewith and receiving within its groove the edge of said disk, guides for directing the collar through and beyond said disk and roller, a shaper for receiving the collar as it leaves said disk and roller, and means at the discharge side of said disk and roller for engaging the collar and forcing it along said shaper and comprising a substantially vertical roller and coöperating means for engaging the collar and moving it along said shaper; substantially as set forth.

13. In a collar-folding and shaping machine, a shaft having on its forward end a hollow conical disk whose walls flare forwardly and outwardly, means for driving said shaft and disk, a rotary grooved roller below said disk and coöperating therewith and receiving within its groove the edge of said disk, guides for directing the collar through and beyond said disk and roller, and a curved plate shaper at the discharge side of said disk and roller and along which the folded collar is forced for reducing the same to the desired curvature; substantially as set forth.

Signed at New York city, in the county of New York and State of New York this 5th day of February A. D. 1906.

WILLIAM A. ZEIDLER.

Witnesses:
ARTHUR MARION,
CHAS. C. GILL.

---

Copies of this patent may be obtained for five cents each, by addressing the "Commissioner of Patents, Washington, D. C."